United States Patent
Takeuchi et al.

(10) Patent No.: US 11,084,424 B2
(45) Date of Patent: Aug. 10, 2021

(54) VIDEO IMAGE OUTPUT APPARATUS, VIDEO IMAGE OUTPUT METHOD, AND MEDIUM

(71) Applicant: JVCKENWOOD Corporation, Yokohama (JP)

(72) Inventors: Masato Takeuchi, Yokohama (JP); Masaru Negishi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/092,866

(22) Filed: Nov. 9, 2020

(65) Prior Publication Data

US 2021/0053491 A1 Feb. 25, 2021

Related U.S. Application Data

(63) Continuation of application No. PCT/JP2019/016491, filed on Apr. 17, 2019.

(30) Foreign Application Priority Data

May 16, 2018 (JP) .............................. JP2018-094305

(51) Int. Cl.
*B60R 1/00* (2006.01)
*B60R 1/12* (2006.01)
*G06K 9/00* (2006.01)

(52) U.S. Cl.
CPC .............. *B60R 1/008* (2013.01); *B60R 1/12* (2013.01); *G06K 9/00838* (2013.01); *G06K 9/00845* (2013.01); *B60R 2001/1253* (2013.01)

(58) Field of Classification Search
CPC ... B60R 1/008; B60R 1/12; B60R 2001/1253; B60R 11/02; B60R 11/04;
(Continued)

(56) References Cited

U.S. PATENT DOCUMENTS 6,553,296 B2 * 4/2003 Breed ................ B60R 21/0152
701/45
6,809,643 B1 * 10/2004 Elrod ................. A61B 5/02055
180/271
(Continued)

FOREIGN PATENT DOCUMENTS

JP 2008-199515 A 8/2008
JP 2012-121387 A 6/2012
(Continued)

OTHER PUBLICATIONS

Extended European Search Report dated Jun. 10, 2021 corresponding to application No. 19802954.8-1207.

*Primary Examiner* — James M Pontius
(74) *Attorney, Agent, or Firm* — Nath, Goldberg & Meyer; Jerald L. Meyer (57) ABSTRACT

A video image output apparatus includes a video image data acquisition unit, a motion detection unit, a state determination unit and a video image control unit. The video image data acquisition unit acquires an occupant image obtained by picking up an occupant in a vehicle. The motion detection unit detects a movement of the occupant based on the acquired occupant image. The video image control unit generates a display image such that at least a part of the display image is displayed in a predetermined form when the state determination unit determines that a motion amount of the occupant is equal to or greater to than a reference value, and generates the display image such that the occupant image is displayed only for a predetermined time when the state determination unit determines that the motion amount of the occupant is less than the reference value.

8 Claims, 8 Drawing Sheets

(58) Field of Classification Search
CPC .. G06K 9/00838; G06K 9/00845; G06T 7/00;
G06T 7/20; G09G 5/10; G09G 5/00;
G09G 5/02; G09G 5/377; H04N 7/18
See application file for complete search history.

(56) References Cited

U.S. PATENT DOCUMENTS

| | | | | |
|---|---|---|---|---|
| 7,463,161 | B2* | 12/2008 | Griffin | B60N 2/002 |
| | | | | 180/271 |
| 8,179,274 | B2* | 5/2012 | Rork | B60N 2/002 |
| | | | | 340/667 |
| 9,381,856 | B1* | 7/2016 | Arnold | B60H 1/00978 |
| 10,229,654 | B2* | 3/2019 | Kim | G06K 9/00805 |
| 10,237,211 | B2* | 3/2019 | Arita | B60R 1/00 |
| 10,949,688 | B2* | 3/2021 | Katsumata | G06K 9/00845 |
| 2004/0090525 | A1* | 5/2004 | Eichmann | G08B 13/19647 |
| | | | | 348/148 |
| 2006/0267780 | A1* | 11/2006 | Adams | G08B 21/0423 |
| | | | | 340/573.1 |
| 2009/0134984 | A1* | 5/2009 | Chen | G09F 21/04 |
| | | | | 340/425.5 |
| 2009/0174774 | A1* | 7/2009 | Kinsley | B60R 1/00 |
| | | | | 348/148 |
| 2009/0284598 | A1* | 11/2009 | Busch | B60R 1/12 |
| | | | | 348/148 |
| 2013/0090807 | A1* | 4/2013 | Kojima | G06F 17/00 |
| | | | | 701/36 |
| 2014/0118548 | A1* | 5/2014 | Veneziano | H04N 5/2256 |
| | | | | 348/148 |
| 2015/0015479 | A1* | 1/2015 | Cho | G06F 3/1423 |
| | | | | 345/156 |
| 2017/0263024 | A1* | 9/2017 | Oshima | G06Q 30/0201 |
| 2017/0334451 | A1* | 11/2017 | Asakura | B60W 10/20 |
| 2018/0348758 | A1* | 12/2018 | Nakamura | B60W 30/12 |
| 2020/0047697 | A1* | 2/2020 | Okuma | B60Q 1/0076 |
| 2021/0053491 | A1* | 2/2021 | Takeuchi | G09G 5/10 |
| 2021/0074144 | A1* | 3/2021 | Abe | G08B 3/10 |

FOREIGN PATENT DOCUMENTS

| | | |
|---|---|---|
| JP | 2014-223887 A | 12/2014 |
| JP | 2015-067254 A | 4/2015 |

* cited by examiner

FIG. 1

FIG. 2A (RED COLOR)

FIG. 2B (GREEN COLOR)

VIDEO IMAGE OUTPUT APPARATUS, VIDEO IMAGE OUTPUT METHOD, AND MEDIUM

CROSS REFERENCE TO RELATED APPLICATION

This is a continuation application based on PCT application No. PCT/JP2019/01491 filed on Apr. 17, 2019, which claims the benefit of priority from Japanese Patent Application No. 2018-094305 filed on May 16, 2018, the entire contents of which are incorporated by reference herein.

BACKGROUND

The present invention relates to a video image output apparatus, a video image output method, and a medium for outputting an image of an occupant such as an infant who rides in a vehicle.

For example, when driving a vehicle with an infant sitting on a child seat installed in a rear seat of the vehicle, a driver appropriately monitors the infant and recognizes a state where the infant is sleeping, waking, crying, or the like. As a video image output apparatus for monitoring such a state of an occupant, there has been known a video image output apparatus disclosed in Japanese Patent Application Laid-Open No. 2015-67254 (Patent Document 1), for example.

Patent Document 1 discloses that a driver can easily monitor a state of an occupant on a rear seat of a vehicle by using the apparatus which recognizes a facial expression of the occupant on the rear seat of the vehicle and displays on a display an icon such as a crying face, a smiling face, a sleeping face, or the like.

However, in Patent Document 1, since the apparatus displays the state of the occupant as an icon, a driver driving the vehicle cannot immediately recognize a change in the state of the occupant. When the vehicle is stopped, the driver wants to directly check the facial expression of the occupant, but only the icon is displayed.

SUMMARY

According to a first aspect of the embodiments, there is provided a video image output apparatus including: a video image acquisition unit configured to acquire an occupant image obtained by picking up an occupant in a vehicle, a motion detection unit configured to detect a movement of the occupant based on the occupant image; a state determination unit configured to determine a state of the occupant based on the movement of the occupant; and a video image control unit configured to control a generation of a to display image to be displayed on a display based on the movement of the occupant; wherein the video image control unit generates the display image such that at least a part of the display image is displayed in a predetermined form when the state determination unit determines that a motion amount of the occupant is equal to or greater than a reference value, and generates the display image such that the occupant image is displayed only for a predetermined time when the state determination unit determines that the motion amount of the occupant is less than the reference value.

According to a second aspect of the embodiments, there is provided a video image output method including: a step of acquiring an occupant image obtained by picking up an occupant in a vehicle; a step of detecting a movement of the occupant based on the occupant image; a step of determining a state of the occupant based on the movement of the occupant; and a step of generating a display image such that at least a part of the display image is displayed in a predetermined form when the determining step determines that a motion amount of the occupant is equal to or greater than a reference value, and generating the display image such that the occupant image is displayed only for a predetermined time when the determining step determines that the motion amount of the occupant is less than the reference value.

According to a third aspect of the embodiments, there is provided a non-transitory computer usable medium having a computer readable program embodied therein, the program including: a first program code causing the computer to acquire an occupant image obtained by picking up an occupant in a vehicle; a second program code causing the computer to detect a movement of the occupant based on the occupant image; a third program code causing the computer to determine a state of the occupant based on the movement of the occupant; and a fourth program code causing the computer to generate a display image such that at least a part of the display image is displayed in a predetermined form when the determining step determines that a motion amount of the occupant is equal to or greater than a reference value, and generating the display image such that the occupant image is displayed only for a predetermined time when the determining step determines that the motion amount of the occupant is less than the reference value

DETAILED DESCRIPTION

Embodiments will be described below with reference to the drawings.

First Embodiment

Figure 1:
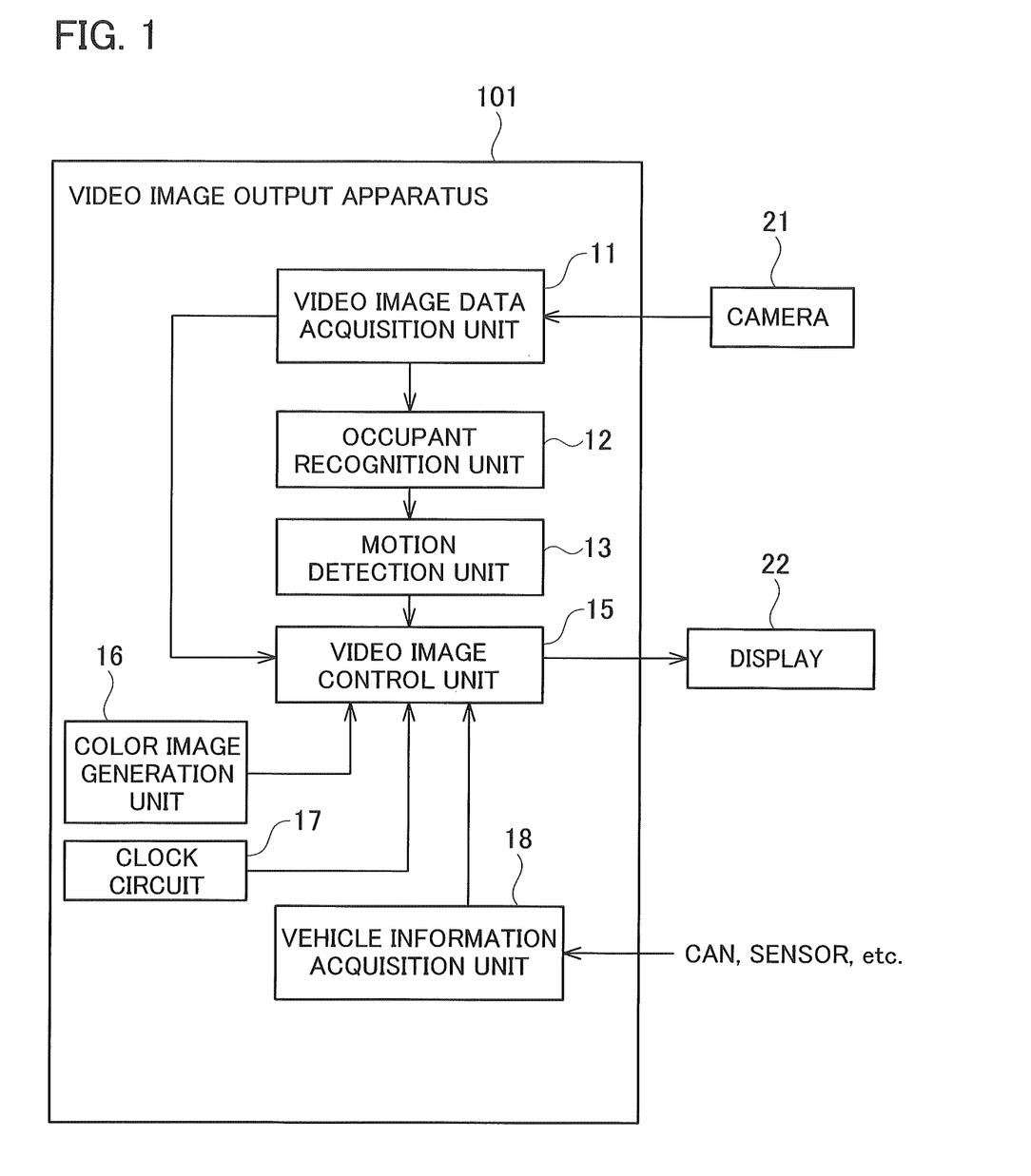
FIG. 1 is a block diagram illustrating a configuration of a video image output apparatus according to first and second embodiments.

FIG. 1 is a block diagram illustrating a configuration of a video image output apparatus and peripheral devices thereof according to a first embodiment and a second embodiment to be described later. As illustrated in FIG. 1, a video image output apparatus 101 is mounted on a vehicle and is connected to a camera 21 for picking up images of an occupant such as an infant sitting on a seat of the vehicle and a display 22 (display unit) for displaying various images.

The camera 21 picks up images of at least one occupant sitting on at least one of seats such as a front passenger seat, a rear left seat, and a rear right seat of the vehicle. The camera 21 can be provided at a position where all seats in the vehicle are overlooked, or can be provided at a position where only a seat on which an infant sits is imaged, for example. The camera 21 can also be used as a camera for a drive recorder provided in the vehicle. The camera 21 may be configured by a plurality of cameras. The camera 21 may be configured such that images can be picked up in a wide range by one camera using a super-wide angle lens.

The display 22 displays image data (display image) output from a video image control unit 15 which will be described later. The display 22 is provided exclusively for displaying image data. The display 22 may also serve as a monitor screen for displaying a navigation image, an electronic mirror, or a monitor screen for a drive recorder. Details will be described later.

The video image output apparatus 101 includes a video image data acquisition unit 11 (video image acquisition unit), an occupant recognition unit 12, a motion detection unit 13, the video image control unit 15, a color image generation unit 16, a clock circuit 17, and a vehicle information acquisition unit 18.

The video image data acquisition unit 11 acquires image data picked up by the camera 21. In particular, an occupant image which is an image of an occupant such as an infant is acquired.

The occupant recognition unit 12 recognizes an infant (occupant) from the image acquired by the video image data acquisition unit 11. More specifically, since the image data picked up by the camera 21 includes a child seat on which an infant sits and a background image, an image of an infant, particularly an image of a face and a body of the infrant, is recognized.

The motion detection unit 13 detects whether or not a movement occurs in an infant based on the image of the infant recognized by the occupant recognition unit 12. A movement of an infrant includes moving parts of his/her face such as an eye and a mouth, and moving his/her limb. If a motion amount of an infrant is equal to or greater than a reference value, which is set when detection of a movement of the infant is started, it is determined that a movement occurs.

The video image control unit 15 performs a process of generating an image (display image) to be displayed on the display 22 in accordance with whether or not a movement occurs in an infant, by using the motion detection unit 13. Details will be described later.

The color image generation unit 16 generates a color image for a display image generated by the video image control unit 15 and outputs the color image to the video image control unit 15.

The vehicle information acquisition unit 18 is connected to a CAN (Controller Area Network), a sensor, and the like mounted on the vehicle, and acquires driving information of the vehicle such as vehicle speed data acceleration data, and accelerator opening. If the vehicle is equipped with an automatic driving device or a driving assistance device, information about what kind of driving assistance function the vehicle is currently performing may be acquired. As diriving assistance functions, there are known LKS (Lane Keeping System), ACC (Adaptive Cruise Control) and the like. The vehicle information acquisition unit 18 is a component used in a second embodiment to be described later, and is not an essential component in the first embodiment.

The clock circuit 17 counts the elapsed time. More specifically, an intermittent display time (2 seconds, 10 seconds, etc.) to be described later is counted. Note, without providing the clock circuit 17, the elapsed time may be counted by using time data acquired from CAN or the like.

Figure 2A:
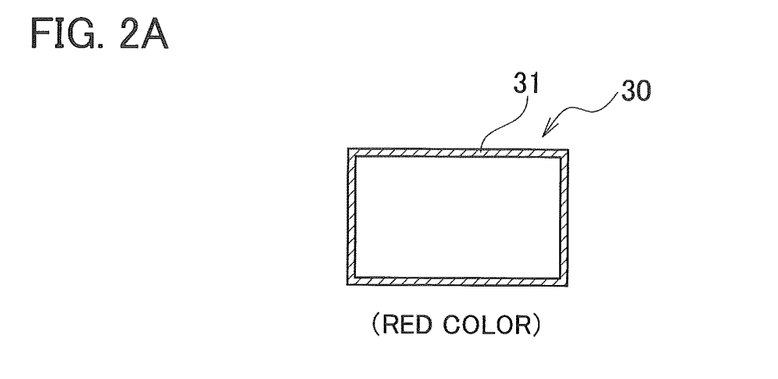
FIG. 2A is an explanatory diagram illustrating a display example of an infant image, which is a display example when a movement of an infant is detected.
Figure 2B:
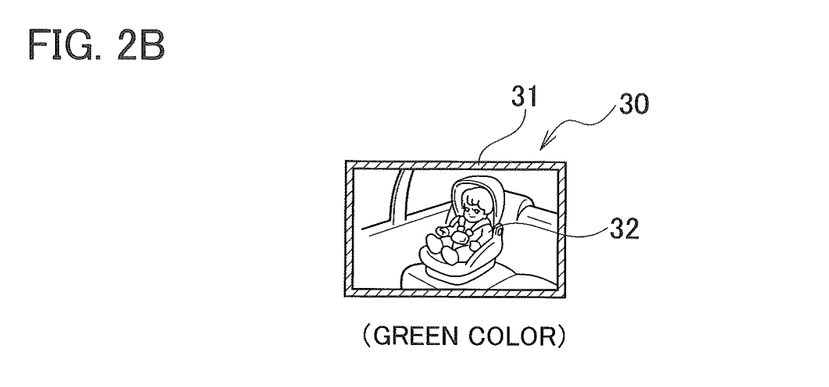
FIG. 2B is an explanatory diagram illustrating a display example of an infant image, which is a display example when a movement of an infant is not detected.

Next, the detailed processing of the video image control unit 15 will be described with reference to display examples illustrtated in FIG. 2A to FIG. 5. FIG. 2A is an explanatory diagram illustrating a display example when a movement occurs in an infant. FIG. 2B is an explanatory diagram illustrating a display example when no movement occurs in an infant.

When the motion detection unit 13 determines that a movement occurs in an infant, that is, determines that the above-described motion amount is equal to or grater than the reference value, the video image control unit 15 generates a display image in which a color of at least a part of a display area 30, for example, a color of a surrounding frame 31 is red (predetermined display color),as illustrated in FIG. 2A. That is, the video image control unit 15 generates a display image having a red frame image generated by the color image generation unit 16. At this time, the video image control unit 15 does not display anything in an area within the surrounding frame 31. The video image control unit 15 may generate a display image in which a whole of the display area 30 is set to the predetermined display color. The video image control unit 15 may generate a display image in which a part of the display area 30 such as an upper part or a lower part of the display area 30 is set to the predetermined display color.

When no movement occurs in an infant is determined, the video image control unit 15 changes a color of the surrounding frame 31 to green (other display colors) as illustrated in FIG. 2B, and generates a display image in which an image of an infant 32 (occupant image) is displayed in the area within the surrounding frame 31. The video image control unit 15 may gradually change the color of the surrounding frame 31 from red to green as the motion amount decreases from the state where the movement occurs in the infant That is, the video image control unit 15 may gradually change a chromaticity displayed on the surrouding frame 31. In addition to the chromaticity, the video image control unit 15 may change a density of the display color or a transmittance. By changing the transmissivity, the red color can be gradually reduced to a colorless display mode.

When no movement occurs in an infant, the video image control unit 15 changes the color of the surrouding frame 31 from red to green, and intermittently displays the image of the infant 32 in the area within the surrounding frame 31. For example, the video image control unit 15 generates a display image for which a display time and a non-display time are alternately repeated such as 2 seconds for display, 10 seconds for non-display, 2 seconds for display, and so on. That is, when the movement of the infant is not detected, the video image control unit 15 generates a display image for displaying the image of the infant 32 only for a predetermined time. The video image control unit 15 outputs the generated display image to the display 22. Note, instead of intermittently displaying the image of the infant 32, the video image control unit 15 may display the image of the infant 32 for a predetermined time period (for example, 5 seconds) from the point of time when it is detected that no movement of the infant occurs, and then display only the green surrounding frame 31. That is, the video image control unit 15 changes a display state of the occupant image.

Therefore, when it is determined that the movement occurs in the infant and the infant is waking, a display image in which the surrounding frame 31 of the display area 30 is lighted in red, is generated and output to the display 22. Thereby, the driver during the driving can recognize that the infant is waking by a natural eye movement without gazing at the display area 30 for a long time. Since the image of the infant is not displayed, it is possible to prevent the driver from continuously looking at the display area 30 for a long time.

On the other hand, when it is determined that no movement occurs in the infant and the infant is sleeping, a display image in which the color of the surrouding frame 31 is changed to green and the image of the infant 32 is displayed in the area within the surrounding frame 31, is generated and output to the display 22. Thereby, the driver can confirm the sleeping state of the infant by the image. Further, since the image of the infant 32 is displayed intermittently, it is possible to prevent the driver from continuously looking at the display area 30 for a long time.

Thus, the video image control unit 15 generates a display image in which at least a part of the display 22, for example, the surrounding frame 31 is dispalyed in red (predetermined display color) and then displays the display image on the display 22 when the motion detection unit 13 detects the movement of the infant (occupant), and generates a display image (for example, a display image displayed intermittently) in which the image of the infant is displayed only for a predetermined time and then displays the display image on the display 22 when the motion detection unit 13 does not detect the movement of the infant.

Figure 3:
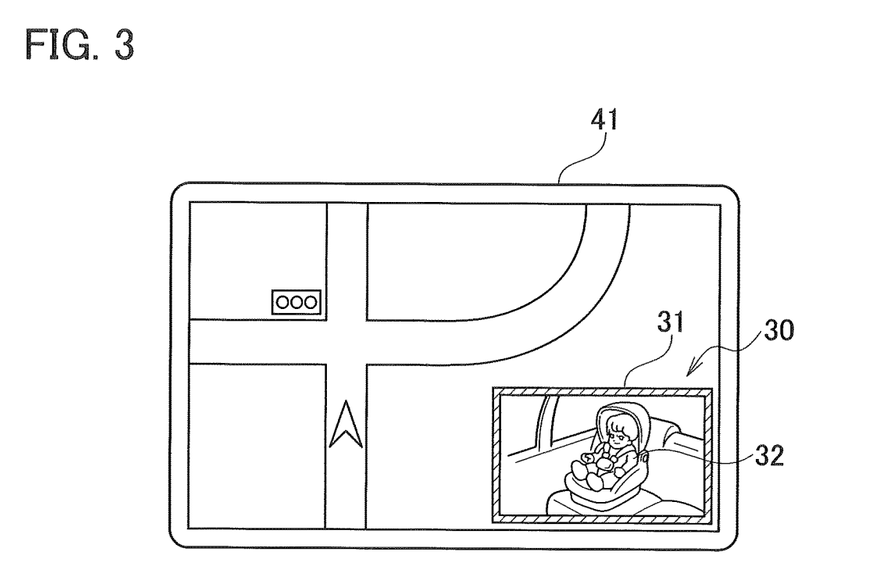
FIG. 3 is an explanatory diagram illustrating an example in which an image of an infant is displayed on a monitor for a navigation display.
Figure 4:
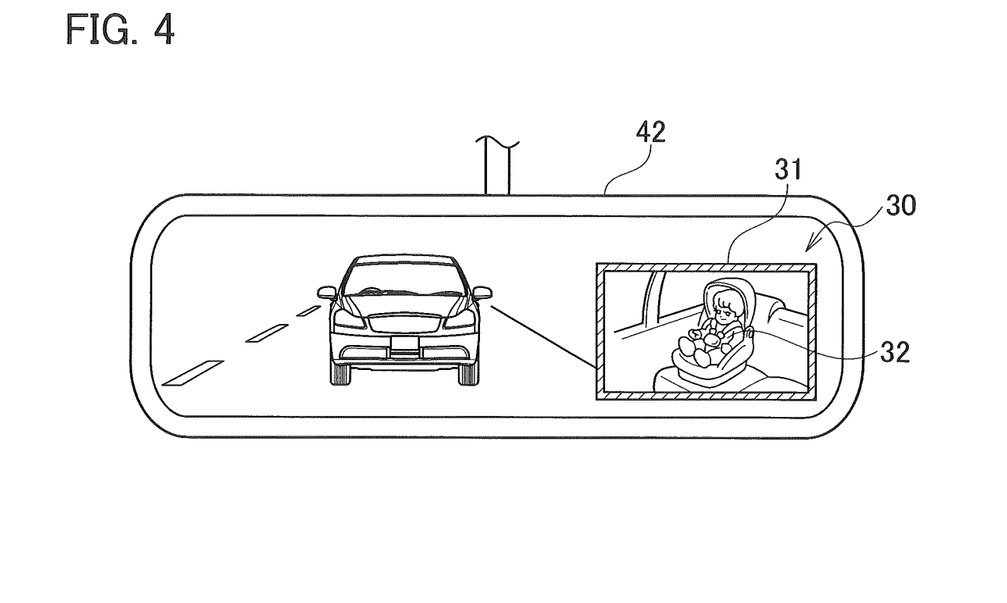
FIG. 4 is an explanatory diagram illustrating an example in which an image of an infant is displayed on an electronic mirror.
Figure 5:
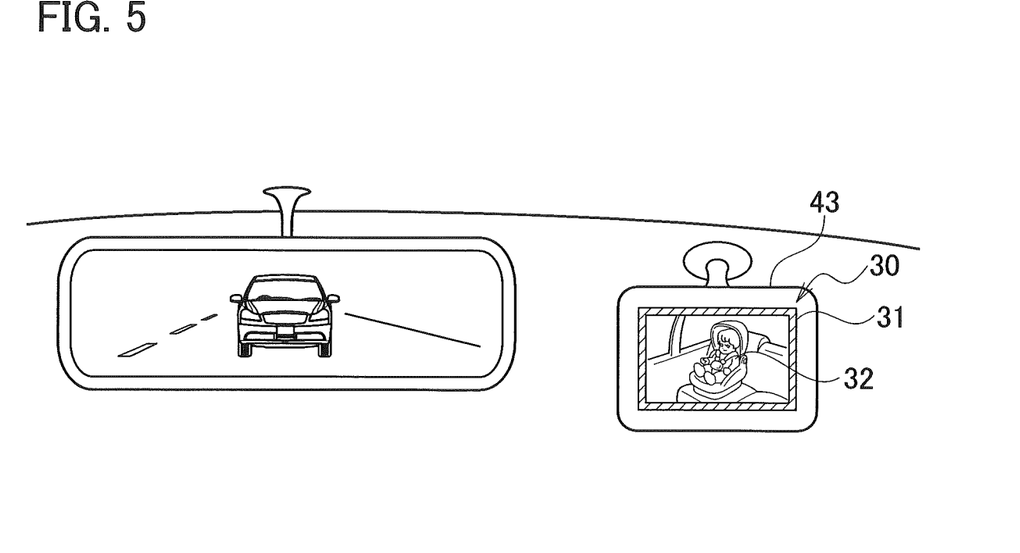
FIG. 5 is an explanatory diagram illustrating an example in which an image of an infant is displayed on a monitor of a drive recorder.

Next, a specific display example of the display area 30 will be described. FIG. 3 illustrates an example in which the display area 30 of the display image is displayed at a lower right of a navigation screen 41. FIG. 4 illustrates an example in which the display area 30 is displayed on a right side of an electronic mirror 42. FIG. 5 illustrates an example in which the display area 30 is displayed on a display screen of a drive recorder 43. Thus, by setting the display area 30 to an existing monitor device, it is not necessary to provide a special monitor for monitoring an infant. Note, the video image control unit 15 may be provided with a wireless communication function or may be connected to a wireless communication module, and display the display image by transmitting it to a portable terminal via a wireless communication. That is, the display 22 may be a display screen of the portable terminal.

Next, the processing procedure of the video image output apparatus 101 according to the first embodiment will be described with reference to the flowchart illustrated in FIG. 6.

First, in step S11, the video image data acquisition unit 11 acquires image data (occupant image) picked up by the camera 21.

In step S12, the occupant recognition unit 12 recognizes an infant (occupant) included in the image data acquired by the video image data acquisition unit 11.

In step S13, the motion detection unit 13 detects whether or not a movement occurrs in the infant based on the image of the infant.

In step S14, the motion detection unit 13 determines whether or not the motion amount of the infant detected in step S13 is equal to or greater than the reference value. As described above, when the motion amount of the infant is equal to or greater than the reference value, the motion detection unit 13 determines that a movement occurrs in the infant.

If the motion amount is equal to or greater than the reference value (YES in step S14), the color image generation unit 16 generates a red frame image in step S15.

In step S16, the video image control unit 15 synthesizes the red frame image on the surrounding frame 31 of the display area 30. As a result, as illustrated in FIG. 2A, the red frame image is synthesized on the surrounding frame 31 of the display area 30. Further, the video image control unit 15 removes the image data acquired in the process of step S11. Therefore, the surrounding frame 31 is set to be red, and a display image in which nothing exists inside the surrouding frame 31, is generated.

In step S17, the video image control unit 15 outputs data of the display image generated in the process of step S16 to the display 22.

On the other hand, if the motion amount of the infant is less than the reference value (NO in step S14), the color image generation unit 16 generates a green frame image in step S18.

In step S19, the video image control unit 15 synthesizes the green frame image on the imge data. As a result, as illustrated in FIG. 2B, the green frame image is synthesized on the surrounding frame 31 of the display area 30, and a display image in which the image of the infant exists inside the surrounding frame 31, is generated. At this time, the video image control unit 15 gradually changes a color of the surrounding frame 31 in accordance with a change in the motion amount of the infant. For example, when the motion amount of the infant slowly decreases to be below the reference value, the color of the surrounding frame 31 is gradually changed from red to green. Thereby, it is possible to recognize that the infant is gradually shifting to a sleeping state by using the change of the color of the surrounding frame 31.

In step S20, the video image control unit 15 outputs to the display 22 as an image in which display and non-display are alternately repeated, image data included in the display image generated in the process of step S19.

As a result, when the movement of the infant is equal to or greater than the reference value, the display image in which the surrounding frame 31 is displayed in red is displayed on the display 22 as illustrated in FIG. 2A. When the movement of the infant is less than the reference value, the surrounding frame 31 is displayed in green, and the display image in which the image of the infant is intermittently displayed inside the surrounding frame 31 on the display 22 as illustrated in FIG. 2B.

As described above, the video image output apparatus 101 according to the first embodiment detects the movement of the infant, determines that the infant is waking when the motion amount is equal to or greater than the reference value, and displays the surrounding frame 31 around the display area 30 in red (predetermined display color). In this case, the image of the infant is not displayed in the area inside the surrounding frame 31. Therefore, the driver can easily recognize that the infant is waking by visually recognizing the red color of the surrounding frame 31. Further, since the driver is prevented from continuously looking at the display 22 for a long time, it is possible to prevent the driver from inattentive driving by continuously looking at the display 22.

On the other hand, the video image output apparatus 101 according to the first embodiment determines that the infant is sleeping when the motion amount of the infant is less than the reference value, and displays the surrounding frame 31 in green and intermittently displays the image of the infant inside the surrounding frame. That is, the image of the infant is displayed only for a predetermined time. Since a display color of the surrounding frame 31 is green, the driver can intuitively recognize that the infant is sleeping. Further, it is possible to confirm whether or not the infant is sleeping in a safe posture by viewing the image of the infant.

Since the image of the infant is displayed intermittently, it is possible to prevent the driver from looking at the display 22 for a long time.

According to the embodiment, it is possible to easily recognize a change in a state of an occupant.

Second Embodiment

Next, a second embodiment will be described. Since the configuration of the apparatus is the same as that illustrated in FIG. 1 in the first embodiment, the description thereof is omitted. The second embodiment is different from the above-described first embodiment in that the vehicle information acquisition unit 18 illustrated in FIG. 1 acquires driving information of the vehicle such as vehicle speed data, accelerator opening, and a driving support level, and changes a display mode of an image to be displayed on the display 22 according to a driving state of the vehicle.

Specifically, the video image output apparatus 101 according to the second embodiment continuously displays an image of an infant when the vehicle is stopped, and changes a display time for intermittently displaying an image of an infant according to a vehicle speed when the vehicle is running. The processing procedure of the video image output apparatus 101 according to the second embodiment will be described below with reference to the flowchart illustrated in FIG. 7.

Figure 6:
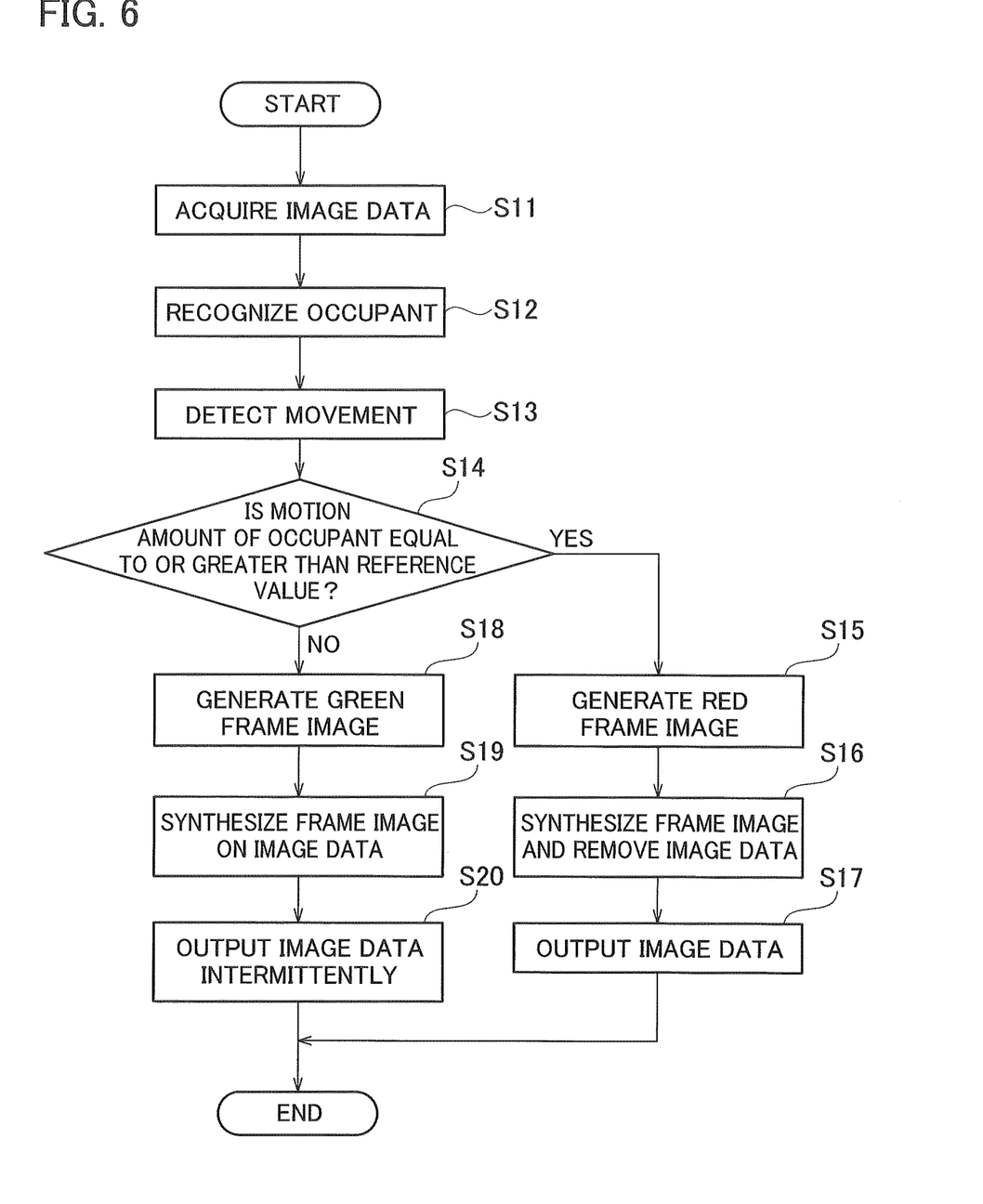
FIG. 6 is a flowchart illustrating a processing procedure of the video image output apparatus according to the first embodiment.
Figure 7:
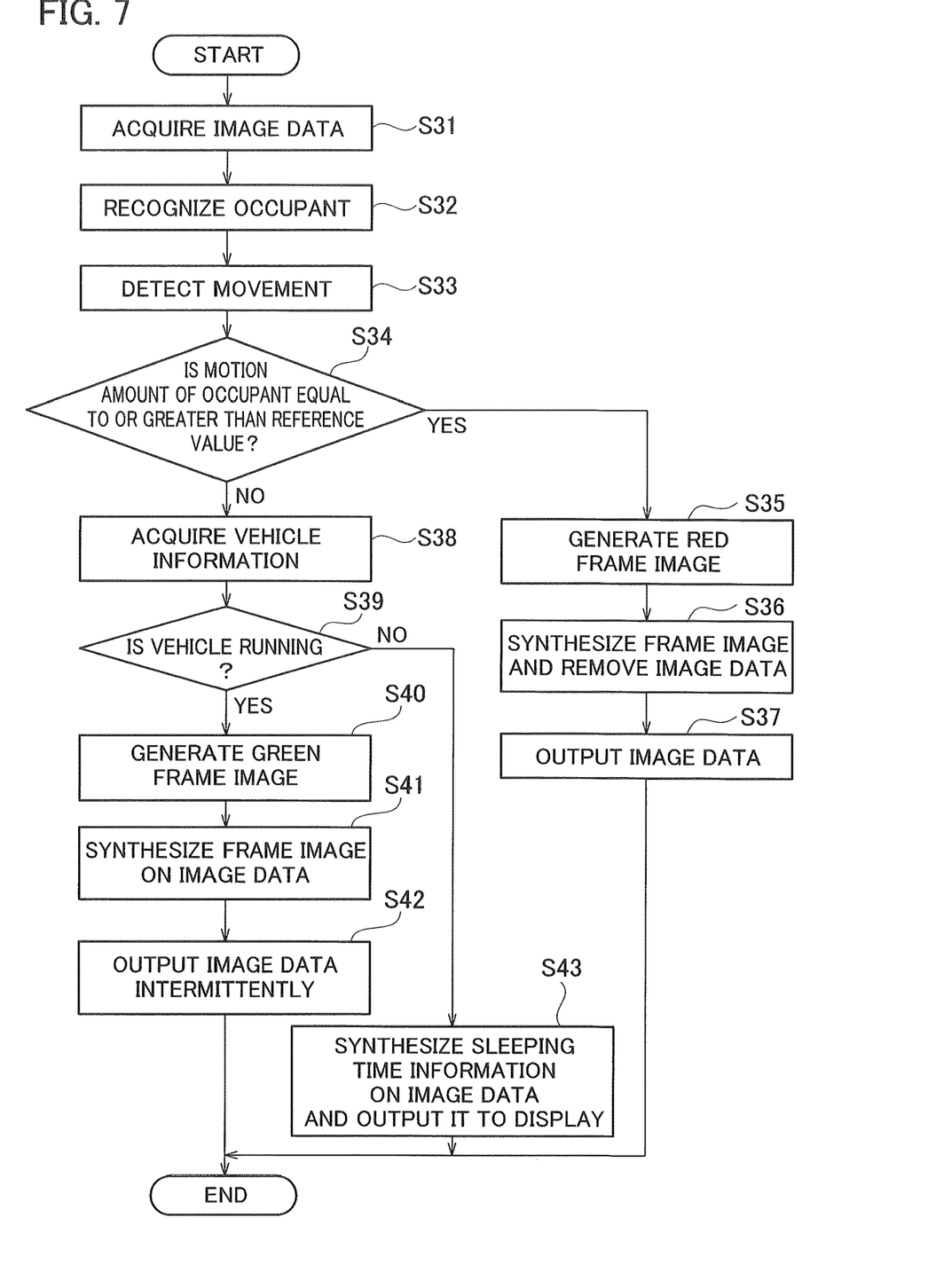
FIG. 7 is a flowchart illustrating a processing procedure of the video image output apparatus according to the second embodiment.

Since the processes in steps S31 to S37 illustrated in FIG. 7 are the same as the processes in steps S11 to S17 illustrated in FIG. 6, the description thereof is omitted.

In step S38 shown in FIG. 7, the vehicle information acquisition unit 18 shown in FIG. 1 acquires vehicle speed data from a CAN mounted on a vehicle or a sensor. The acquired vehicle speed data is outputted to the video image control unit 15.

In step S39, the video image control unit 15 determines whether the vehicle is running or stopped based on the vehicle speed. When the vehicle speed is zero, the video image control unit 15 determines that the vehicle is stopped. Alternatively, when a threshold speed (e.g., 5 kmfh) is set and the vehicle speed is less than the threshold speed (less than a predetermined value), the video image control unit 15 may determine that the vehicle is stopped.

When it is determined in step S39 that the vehicle is running (YES in step S39), the color image generation unit 16 generates a green frame image as illustrated in FIG. 2B and outputs it to the video image control unit 15 in step S40.

In step S41, the video image control unit 15 synthesizes a green frame image on image data. Therefore, the surrounding frame 31 is set to be green, and a display image in which an image of an infant exists inside the surrounding frame 31 is generated.

In step S42, the video image control unit 15 outputs the image of the infant in the generated display image to the display 22 so as to be intermittently displayed. Therefore, when the vehicle is running, an image obtained by synthesizing a green frame image around the image of the infant, is intermittently displayed on the display 22. The display time for intermittently displaying the image data is changed according to the vehicle speed. For example, when the vehicle speed is 40 km/h or less, the image data is displayed for 2 seconds and not displayed for 10 seconds. When the vehicle speed exceeds 40 km/h, the display time is gradually shortened in accordance with an increase in the vehicle speed. For example, when the vehicle speed is 60 km/h, the display time is 1 second and the non-display time is 11 seconds. In this way, when the vehicle speed is higher, the time for the occupant to pay attention to the display 22 is shortened, so that the image of the infant can be displayed while considering the safe traveling of the vehicle.

On the other hand, if the vehicle is not running (NO in step S39), in step S43, the video image control unit 15 calculates a time at which the infant went to sleep and a continuous sleeping time based on time data output from the clock circuit 17, and synthesizes the calculated time and the continuous sleeping time on the display image, Accordingly, the display image is generated by synthesizing data of the time when the infant went to sleep and data of the continuing sleeping time on the image of the infant. The video image control unit 15 outputs the display image to the display 22. Therefore, when the vehicle is stopped, the image of the infant and the data of the sleeping time are displayed on the display 22. In this case, by zooming the image of the infant, the state of the infant can be more easily recognized.

As described above, the video image output apparatus 101 according to the second embodiment displays the surrounding frame 31 in red and does not display the image of the infant when the motion amount of the infant is equal to or greater than the reference value, as in the case of the aforementioned first embodiment. Therefore, the driver can easily recognize that the infant is waking by visually recognizing the red color of the surrounding frame 31. Further, since the driver is prevented from continuously looking at the display 22 for a long time, it is possible to prevent the driver from inattentive driving by continuously looking at the display 22.

On the other hand, the video image output apparatus 101 according to the second embodiment further determines whether or not the vehicle is running when the motion amount of the infant is less than the reference value, and displays the surrounding frame 31 in green, and further displays the image of the infant inside the surrounding frame for a predetermined period of time (for example, intermittently) as in the case of the aforementioned first embodiment, when the vehicle is running. Therefore, the driver can intuitively recognize that the infant is sleeping because the display color of the surrounding frame 31 is green. Further, the driver can confirm whether or not the infant is sleeping in a safe posture by viewing the image of the infant, for example, only for two seconds.

When the vehicle has a driving assistance function or an automatic driving function, driving information may be obtained as to whether or not the vehicle is performing driving assistance processing such as LKS or ACC. When a driving assistance situation indicates that a predetermined processing is not being performed, in other words, when a necessity that the driver of the vehicle pays attention to safe driving is relatively high (when it is indicated that the vehicle is not performing driving assistance above a certain level), the intermittent imge display can prevent the driver from watching the image for a long time.

Further, since the image of the infant is intermittently displayed, it is possible to prevent the driver from looking at the display 22 for a long time. Further, the higher the vehicle speed, the shorter the display time in the intermittent display (shorten the prescribed time), so that the inattentive driving can be prevented.

When the vehicle is stopped, the video image output apparatus 101 according to the second embodiment displays the image of the infant, the data of the time at which the infant went to sleep, and the data of the continuous sleeping time, so that the driver can recognize the state of the infant in more detail. For example, when the vehicle is stopped at a red light, the driver can check the state of the infant in detail.

When a driving assistance situation indicates that a predetermined processing is being performed, in other words, when a necessity that the driver of the vehicle pays attention to safe driving is relatively low (when it is indicated that the vehicle is performing driving assistance above a certain level), the display may allow the driver to check the state of the infant in detail. For example, when automatic driving at level 3 or higher specified by SAE International's "SAE J3016" is in progress, since the driver can drive with a relatively large margin of time, the driver can check the state of infant in detail. Further, when the driving support process is being performed, there may be a display mode in which a predetermined time for displaying the image of the infant is increased or an interval time for intermittent display is increased.

Third Embodiment

Figure 8:
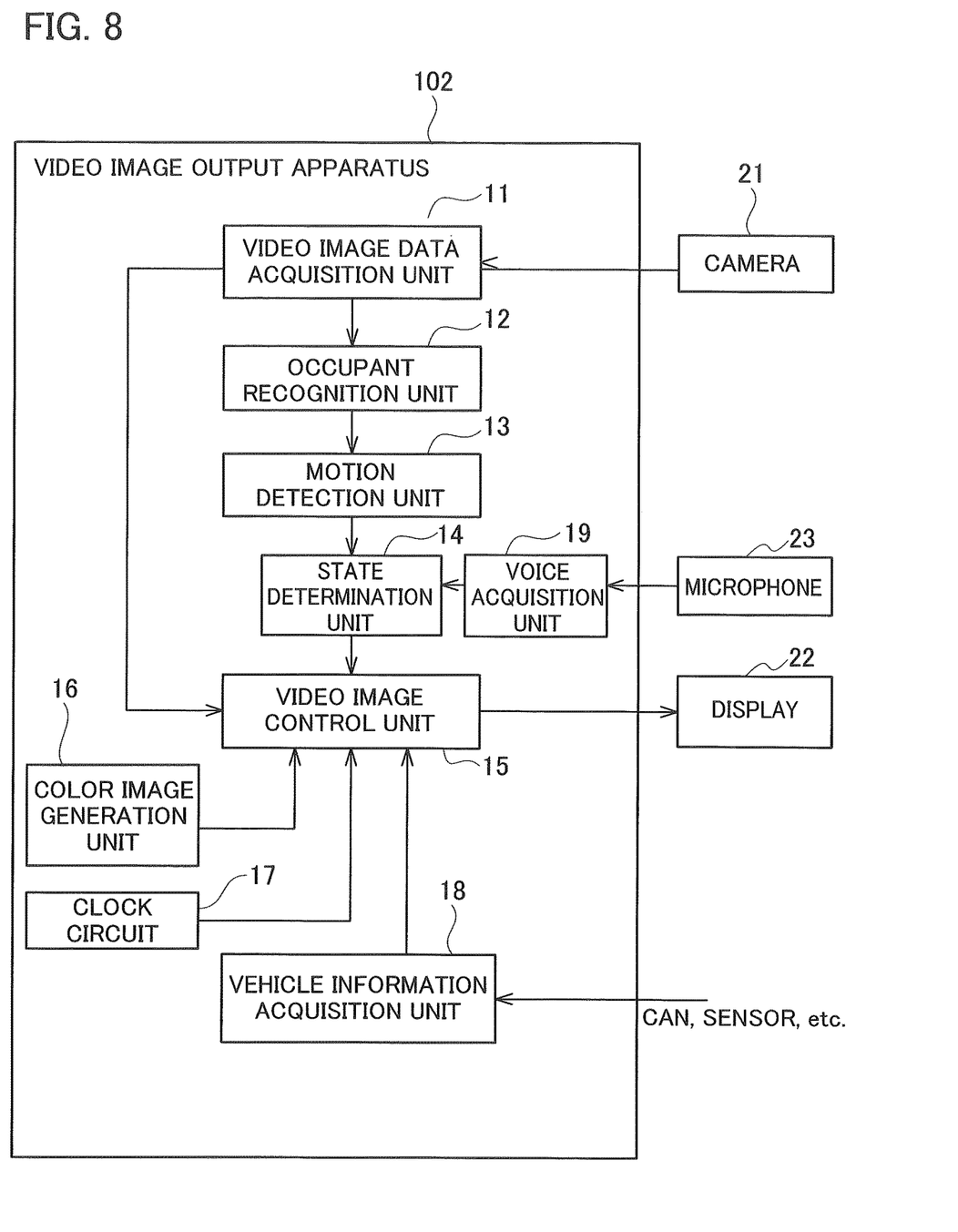
FIG. 8 is a block diagram illustrating a configuration of a video image output apparatus according to a third embodiment.

Next, a third embodiment will be described. FIG. 8 is a block diagram illustrating a configuration of a video image output apparatus 102 according to the third embodiment, As illustrated in FIG. 8, the video image output apparatus 102 according to the third embodiment is different from the video image output apparatus 101 illustrated in FIG. 1 in that the video image output apparatus 102 includes a state determination unit 14 and a voice acquisition unit 19, and the voice acquisition unit 19 is connected to a microphone 23. Since the other components are the same as those in FIG. 1, they are denoted by the same reference numerals and their description is omitted. The microphone 23 may be connected by wireless communication between the microphone 23 and the voice acquisition unit 19 or between the voice acquisition unit 19 and the state determination unit 14 by using a microphone of a portable terminal.

The microphone 23 illustrated in FIG. 8 detects a voice uttered by the infant and outputs it to the voice acquisition unit 19.

The state determination unit 14 determines whether the infant is sleeping, has a state silimar to a sleeping state, or is waking based on the movement of the infant detected by the motion detection unit 13. Known techniques may be used as criteria for determining whether the infant is sleeping, such as a change in a direction of a face of the infant or the movements of the hands and feet being greater than or equal to a predetermined value, the movement continuing for a predetermined period of time or longer, or the occurrence of intermittent movements a predetermined number of times or more. When an observed person is not an infant, a state in which the observed person is meditating or a state in which the observed person is indulging in his/her thoughts may be determined as a sleeping state or a state similar to the sleeping state.

For determining a transition from sleeping to waking, for example, when a threshold time (e.g., 2 seconds) for the movement of the infant is set and the movement of the infant is detected continuously for the threshold time or more, the state determination unit 14 determines that the infant is waking. In other words, the state determination unit 14 determine that the movement of less than 2 seconds does not correspond to a waking because there is a possibility that the movement of less than 2 seconds corresponds to a random movement while sleeping such a movement of eyes (Rapid Eye Movement), yawning, or rolling over of the infant while the infant is sleeping.

Note in a yawn, the infant opens a mouth widely to perform slow and long breaths at first, keeps the mouth open for a while, and then closes the mouth. It may be determined that the movement of the infant corresponds to a yawn by preparing a yawning model showing such a movemen and comparing the movement of the infant with the yawning model. When it is determined that the movement of the infant corresponds to a yawn, it can be determined that the infant is not waking.

Furthermore, even when no movement is detected, if the microphone 23 detects a voice uttered by the infant, the state determination unit 14 determines that the infant is waking. Further, the state determination unit 14 stores samples of voices casually uttered by an infant while sleeping such as "Ah, hum." and "MMM . . . ", and does not use the samples for determining whether the infant is waking when a voice corresponding to at least one of the samples is detected. That is, since the voices in the above samples may be uttered by an infant even when the infant is sleeping, the samples are not adopted as data for determining whether the infant is waking when a voice corresponding to at least one of the samples is detected.

For determining a transition from waking to sleeping, for example, when 10 seconds have elapsed after the movement or voice of the infant is not detected, the state determination unit 14 determines that the infant is sleeping.

Figure 9:
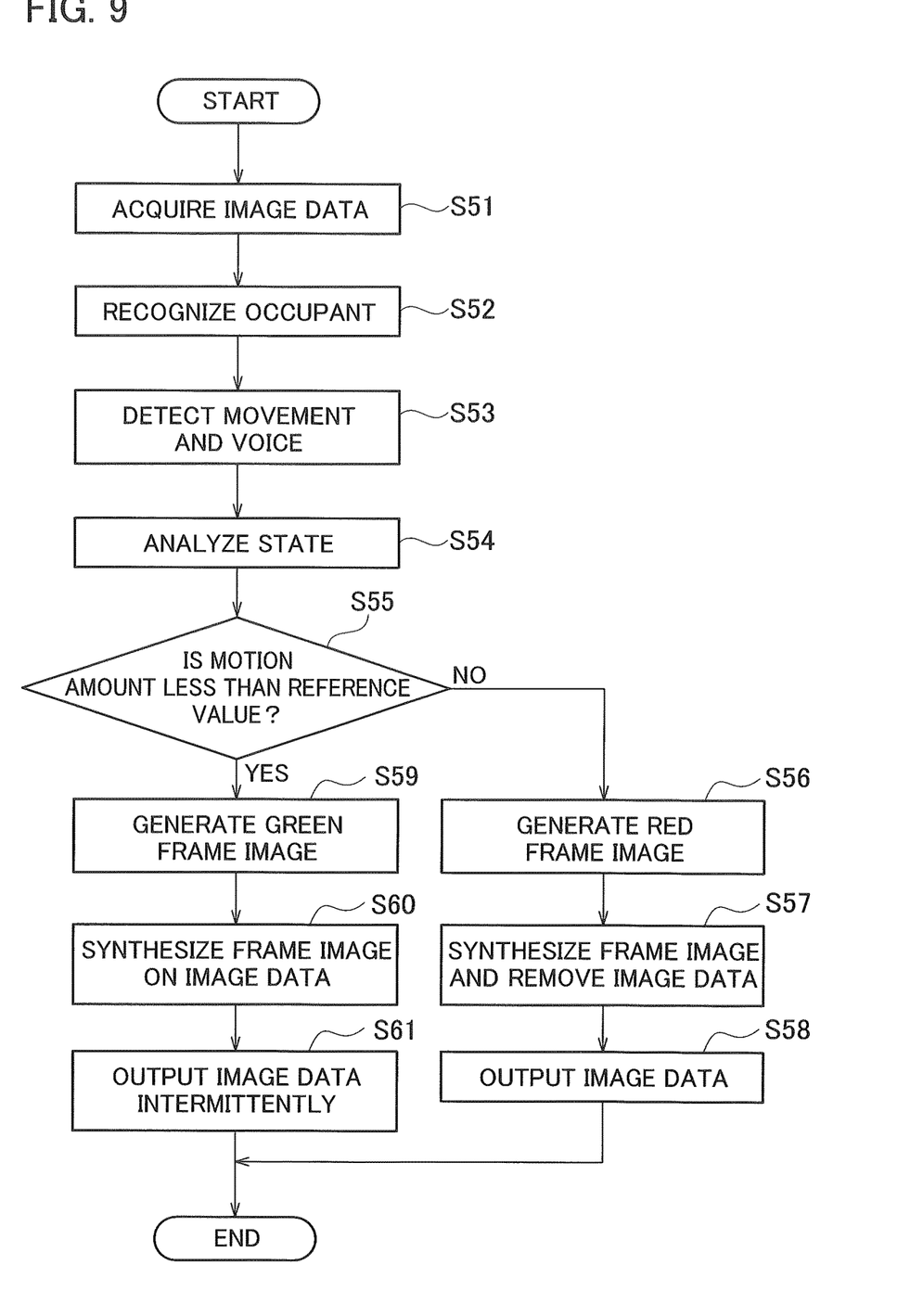
FIG. 9 is a flowchart illustrative a processing procedure of the video image output apparatus according to the third embodiment.

Next, the processing procedure of the video image output apparatus 102 according to the third embodiment will be described with reference to a flowchart illustrated in FIG. 9.

First, in step S51, the video image data acquisition unit 11 acquires image data picked up by the camera 21 (occupant image).

In step S52, the occupant recognition unit 12 recognizes an infant (occupant) included in the image acquired by the video image data acquisition unit 11.

In step S53, the motion detection unit 13 detects whether or not a movement occurrs in the infant based on the image of the infant. Furthermore, the state determination unit 14 acquires voice data detected by the microphone 23.

In step S54, the state determination unit 14 analyzes the movement and voice of the infant, and in step S55, determines whether the infant is sleeping.

When it is determined that the infant is not sleeping (NO in step S55), the processing in steps S56 to S58 is performed. The processing in steps S56 to S58 is the same as the processing in steps S15 to S17 illustrated in FIG. 6.

On the other hand, when it is determined that the infant is sleeping (YES in step S55), the processing in steps S59 to S61 is performed. The processing in steps S59 to S61 is the same as the processing in steps S18 to S20 illustrated in FIG. 6.

As a result, when the infant is not sleeping, an image in which the surrounding frame 31 is displayed in red is displayed on the display 22, as illustrated in FIG. 2A. When the infant is sleeping, the surrounding frame 31 is displayed in green, and the image of the infant is intermittently displayed inside the surrounding frame 31 on the display 22, as illustrated in FIG. 2B.

In this way, the video image output apparatus 102 according to the third embodiment determines whether or not the infant is sleeping, and when the infant is not sleeping, the surrounding frame 31 provided around the display area 30 is displayed in red (predetermined display color). In this case, the image of the infant is not displayed in the area inside the surrounding frame 31. Therefore, the driver can easily recognize that the infant is waking by visually recognizing the red color of the surrounding frame 31, Further, since the driver is prevented from continuously looking at the display 22 for along time, it is possible to prevent the driver from inattentive driving by continuously looking at the display 22.

On the other hand, the video image output apparatus 102 according to the third embodiment displays the surrounding frame 31 in green and intermittently displays the image of the infant inside the surrounding frame when the infant is sleeping. The driver can intuitively recognize that the infant is sleeping because the display color of the surrounding frame 31 is green. In addition, it is possible to confirm whether or not the infant is sleeping in a safe posture by viewing the image of the infant.

Since the image of the infant is displayed intermittently, it is possible to prevent the driver from looking at the display 22 for a long time.

The above-described first to third embodiments describe examples each in which the display color of the surrounding frame 31 is red or green in the display area 30 (see FIGS. 2A and 2B) to indicate the state of the infant, but the embodiment is not limited thereto. For example, a color of at least a part of the display area 30 may be changed.

Fourth Embodiment

Next, a fourth embodiment will be described. The above-described first to third embodiments describe a display indicating the state of one infant (occupant) in the vehicle. In the fourth embodiment, the states of infants setting on a plurality of seats are detected and displayed for each seat.

Since the configuration of the apparatus is the same as that of FIG. 1, the description thereof is omitted. However, the video image data acquisition unit 11 is different in that it acquires images of infants in a plurality of seats of the vehicle based on an image picked up by the camera 21. In order to acquire images of infants, the motion detection unit 13 detects motions of the infants, and a video image control unit 15 generates a display image to be displayed on a display 22 for each infant.

Figure 10:
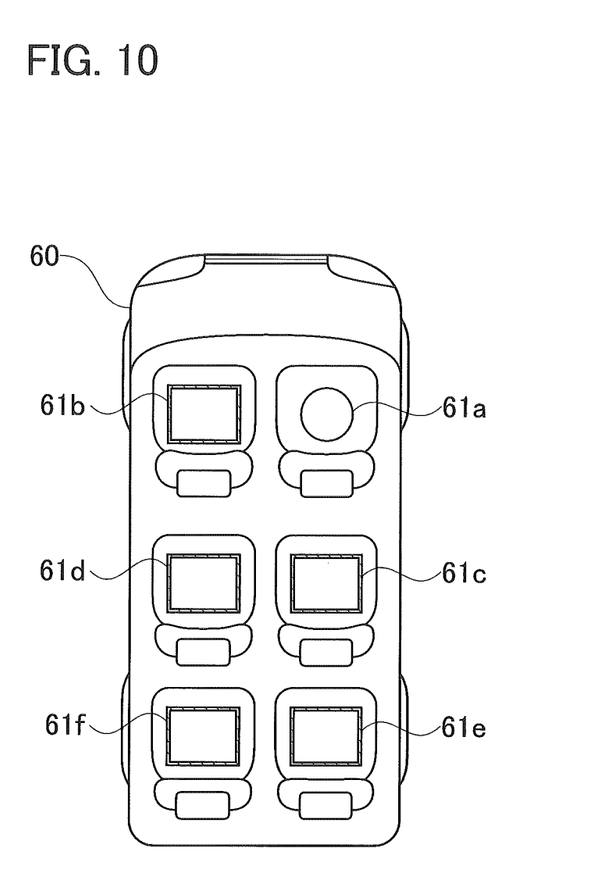
FIG. 10 is a display example of an image showing states of infants sitting on a plurality of seats according to the fourth embodiment.

FIG. 10 is an explanatory diagram illustrating a display example of an image to be displayed on the display 22. FIG. 10 illustrates an example in which the vehicle 60 has La six seats 61a to 61f consisting of two front row seats, two middle row seats, and two rear row seats. As illustrated in FIG. 10, display areas are respectively set in five seats 61b to 61f except for a driver's seat, and an image to be displayed is changed for each seat on which the infant is sitting, in the same manner as in the above-desribed first embodiment. That is, when the infant is waking, the surrounding frame at a position corresponding to a seat on which the infant is suing, is displayed in red. When the infant is sleeping, the surrounding frame is changed to green and the image of the infant is intermittently displayed.

Thus, in the video image output apparatus 102 according to the fourth embodiment, when the infants are sitting on the seats in the vehicle, the state of each infant can be displayed on the display 22 for each seat, so that the states of the infants can be easily recognized.

Although the above-described first to fourth embodiments describe examples each in which the video image output apparatus is mounted on the vehicle, the video image output apparatus may be provided at a remote place such as a base station other than the vhehicle and perform the processing by communicating with the vehicle. Further, although the description has been made by taking an infant as an example of an occupant, the emobdiments are not limited thereto. For example, a state of an elderly person or a sick person may be appropriately displayed on a display.

The above-described video image output apparatuses 101 and 102 can be configured as an integrated computer including, for example, a CPU, a memory, and an input/output unit. Each function shown in the embodiments can be implemented by one or more processing circuits. The processing circuit includes a processing device including an electric circuit. The processing device include a device such as an application specific integrated circuit (ASIC) modified to perform the functions described in the embodiments or a conventional circuit components. The video image output apparatuses 101 and 102 can be replaced with portable terminals, and each function may be realized by an application.

Instead of changing the display color of at least a part of the display image when the movement of the occupant to be detected by the movement detecting unit is detected, a display mode may be changed. For example, it is possible to display an image in a display mode easy to recognize for the driver in which a symbol mark is combined with the image or a width of the surrounding frame for the image is widended. When a movement is detected, an image of the infant may be displayed. In this case, it is preferable to display the image intermittently so that the driver does not gaze at the image of the infant for a long time.

While the embodiments have been described above, the description and drawings to forming part of the disclosure should not be construed as limiting the embodiments. Various alternative embodiments, examples and operational techniques will be apparent to those skilled in the art from this disclosure.

What is claimed is:

1. A video image output apparatus comprising:
   a video image acquisition unit configured to acquire an occupant image obtained by picking up an occupant in a vehicle;
   a motion detection unit configured to detect a movement of the occupant based on the occupant image;
   a state determination unit configured to determine a state of the occupant based on the movement of the occupant; and
   a video image control unit configured to control a generation of a display image to be displayed on a display based on the movement of the occupant;
   wherein the video image control unit generates the display image such that at least a part of the display image is displayed in a predetermined form when the state determination unit determines that a motion amount of the occupant is equal to or greater than a reference value, and generates the display image such that the occupant image is displayed only for a predetermined time when the state determination unit determines that the motion amount of the occupant is less than the reference value.

2. The video image output apparatus according to claim 1, further comprising:
a voice acquisition unit configured to acquire a voice uttered by the occupant;
wherein the state determination unit determines the state of the occupant based on the voice uttered by the occupant in addition to the movement of the occupant.

3. The video image output apparatus according to claim 1, further comprising:
a vehicle information acquisition unit configred to acquire a running state of the vehicle;
wherein the video image control unit generates the display image such that the occupant image is intermittently displayed when the running state of the vehicle indicates that a vehicle speed is equal to or greater than a predetermined value or the vehicle does not perform a driving assistance above a certain level.

4. The video image output apparatus according to claim 1, further comprising:
a vehicle information acquisition unit configured to acquire a running state of the vehicle,
wherein the video image control unit continuously displays the occupant image when the running state of the vehicle indicates that a vehicle speed is less than a predetermined value or the vehicle performs a driving assistance above a certain level, and synthesizes on the display image, at least one of a time when the movement of the occupant is not detected and an elapsed time after the movement of the occupant is not detected.

5. The video image output apparatus according to claim 1, wherein the video image control unit changes at least one of density, chromaticity, and transmissivity of a display color in accordance with the motion amount of the occupant.

6. The video image output apparatus according to claim 1, wherein the video image acquisition unit acquires an occupant image of occupants sitting on a plurality of seats provided in the vehicle, and
the video image control unit generates an image indicating positions of the seats and a display image indicating states of the occupants.

7. A video image output method comprising:
a step of acquiring an occupant image obtained by picking up an occupant in a vehicle;
a step of detecting a movement of the occupant based on the occupant image;
a step of determining a state of the occupant based on the movement of the occupant; and
a step of generating a display image such that at least a part of the display image is displayed in a predetermined form when the determining step determines that a motion amount of the occupant is equal to or greater than a reference value, and generating the display image such that the occupant image is displayed only for a predetermined time when the determining step determines that the motion amount of the occupant is less than the reference value.

8. A non-transitory computer usable medium having a computer readable program embodied therein, the program comprising:
a first program code causing the computer to acquire an occupant image obtained by picking up an occupant in a vehicle;
a second program code causing the computer to detect a movement of the occupant based on the occupant image;
a third program code causing the computer to determine a state of the occupant based on the movement of the occupant; and
a fourth program code causing the computer to generate a display image such that at least a part of the display image is displayed in a predetermined form when the determining step determines that a motion amount of the occupant is equal to or greater than a reference value, and generating the display image such that the occupant image is displayed only for a predetermined time when the deterring step determines that the motion amount of the occupant is less than the reference value.

* * * * *